C. HEFFT.
CULTIVATOR.
No. 73,891. Patented Jan. 28, 1868.
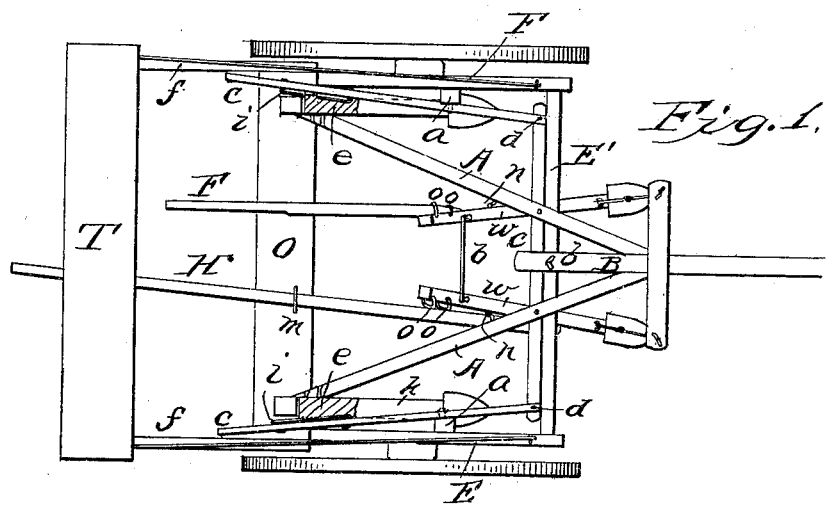
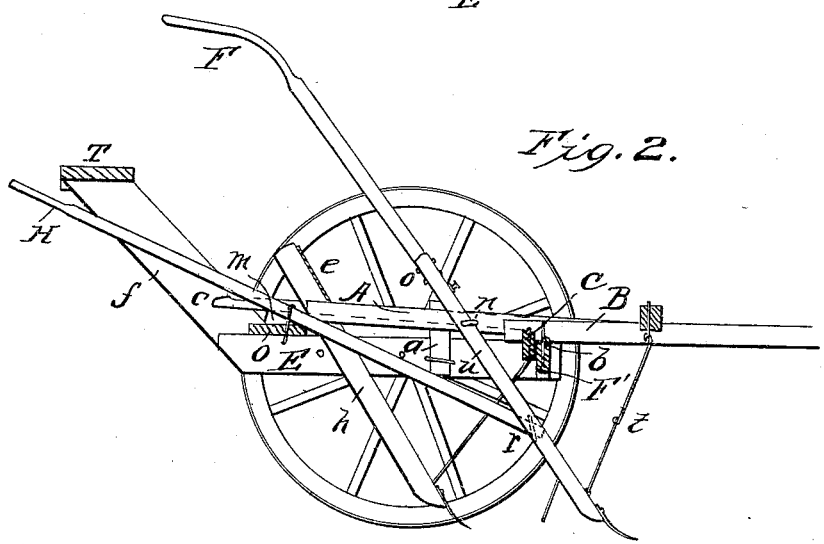
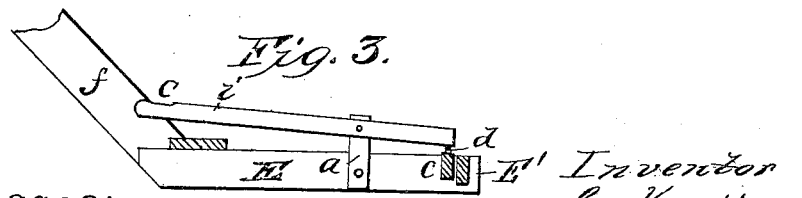
Witnesses:
P. T. Dodge
Geo. H. Grubele
Inventor
C. Hefft
by Dodge & Munn
his attys

United States Patent Office.

CHRISTOFER HEFFT, OF TAZEWELL COUNTY, ILLINOIS.

Letters Patent No. 73,891, dated January 28, 1868.

IMPROVEMENT IN CULTIVATORS.

*The Schedule referred to in these Letters Patent and making part of the same.*

TO ALL WHOM IT MAY CONCERN:

Be it known that I, CHRISTOFER HEFFT, of the county of Tazewell, and State of Illinois, have invented certain new and useful Improvements in Cultivators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists of novel construction of a cultivator for cultivating corn and similar crops, as hereinafter explained.

Figure 1 is a top plan view,

Figure 2 is a longitudinal vertical section, and

Figure 3 a similar view of a portion of the frame.

I construct a main frame of the two side pieces E, a front cross-bar, E', and a rear cross-piece, O, and mount it on wheels, as shown in fig. 1. To the rear end of this frame I secure two inclined standards, $f$, and on them locate a seat, T. I then construct a supplementary frame, consisting of the two diagonal bars A, front cross-bar C, and the tongue B, all bolted rigidly and firmly together, which frame, when thus made, I place within and upon the main frame, and hinge or pivot it thereto by eye-bolts, $b$, at the front cross-bar E', as shown in fig. 2. To the rear ends of the diagonal bars A are rigidly secured the shovel-standards $h$; and near the front portion of the frame another pair of standards $u$ is pivoted to the bars A, in such a manner as to permit them to be moved laterally, they being pivoted on the bent bolts $n$. These front standards, $u$, are connected, near their upper ends, by a rod, $l$, so that they must move simultaneously; and to the side of each, at their upper ends, are secured loops $o$, into which a handle, F, may be inserted, on either side at will, for the purpose of guiding the front shovels, the handle F being arranged to come within the reach of the driver sitting on the seat T, as shown in fig. 2. To the inside of each side bar E is secured a short post or block, $a$, to the upper portion of which is pivoted a lever, $c$, as represented in fig. 3, the front end of these levers being hinged by eye-bolts, $d$, to the outer ends of the cross-bar C of the supplemental frame, as shown in figs. 1 and 3. Upon the front sides of the rear standards $h$ a notched plate, $e$, is secured, these plates being so arranged that the teeth or notches on their inner edges will engage with a rod or plate, $i$, secured to the inside of the levers $c$.

By depressing the levers $c$ at their rear ends, the supplemental frame, with the shovels, will be raised, and, by means of the notches on the plates $e$, can be adjusted at any desired height.

To enable the cultivator to be operated by a person on foot, a long lever, H, is provided, with its front end entering a loop, $r$, on the side of the front standards $u$, and the lever passing through a loop or staple, $n$, fitted loosely in a hole in the cross-piece $m$, as shown in figs. 1 and 2. Both this lever and the handle F may be changed to either side, at pleasure, so as to enable the operator to use either his right or left hand, at will; and, by this means, the front shovels may be guided with ease, with the operator either riding or walking, as he may choose, thus enabling him to vary, so as to rest both himself and the team.

Having thus described my invention, what I claim, is—

1. The combination and arrangement of the diagonal-frame A and cross-bar C, pivoted to the main frame, and having the standards $h$ and $u$ attached thereto, as shown, with the levers $c$, all as shown and described.

2. In combination with the above, I claim the detachable handle F and the lever H, arranged to operate as and for the purposes set forth.

CHRISTOFER HEFFT.

Witnesses:
C. A. ROBERTS,
N. W. GREEN.